United States Patent [19]
Huang et al.

[11] Patent Number: 4,849,385
[45] Date of Patent: Jul. 18, 1989

[54] PROCESS FOR DISPERSING OR REDISPERSING A GROUP VIII NOBLE METAL SPECIES ON A POROUS INORGANIC SUPPORT

[75] Inventors: Yun-Yang Huang, Voorhees; Rene B. LaPierre, Medford; William D. McHale, Swedesboro, all of N.J.

[73] Assignee: Mobil Oil Corporation, New York, N.Y.

[21] Appl. No.: 89,654

[22] Filed: Aug. 26, 1987

[51] Int. Cl.$^4$ .................. B01J 38/42; B01J 38/04; B01J 29/12; B01J 23/96

[52] U.S. Cl. ........................ 502/35; 208/111; 208/140; 502/34; 502/50; 502/66; 502/74; 502/85

[58] Field of Search .............. 502/34, 35, 50, 74, 502/85, 66; 208/140, 111

[56] References Cited

U.S. PATENT DOCUMENTS 2,963,444 12/1960 Nixon .................. 208/140
2,963,445 12/1960 Nixon .................. 502/35
4,657,874 4/1987 Bourghard et al. ........ 502/35

Primary Examiner—Paul E. Konopka
Attorney, Agent, or Firm—Alexander J. McKillop; Charles J. Speciale; Malcolm D. Keen

[57] ABSTRACT

A process for dispersing or redispersing relatively large crystallites of an agglomerated Group VIII noble metal species present on a porous inorganic support is disclosed. The process includes contacting the agglomerated noble metal species, e.g., palladium or platinum, present on the support, e.g., alumina, silica or a zeolite such as ZSM-5 from which at least a major portion of any extraneous matter such as coke or other residue has previously been removed, with nitric oxide (NO) alone or in admixture with a source of halogen such as $Cl_2$ and thereafter removing sorbed nitrogen oxide(s). The thus treated metal-loaded catalyst demonstrates substantially increased benzene hydrogenation activity (BHA) compared to the same catalyst prior to treatment indicating significant dispersion/redispersion of the metal crystallities as smaller crystallities.

15 Claims, No Drawings

PROCESS FOR DISPERSING OR REDISPERSING A GROUP VIII NOBLE METAL SPECIES ON A POROUS INORGANIC SUPPORT

BACKGROUND OF THE INVENTION

This invention relates to a process for dispersing or redispersing a catalytically active noble metal species on a porous inorganic support which itself may or may not possess catalytic activity, e.g., dispersing or redispersing palladium or platinum on a zeolite catalyst such as ZSM-5 which has become deactivated due to the accumulation of carbonaceous material (e.g., coke) during the course of its use in a hydrocarbon conversion operation such as catalytic dewaxing.

Heterogeneous porous inorganic acidic oxides are used extensively in the petroleum and petrochemicals industry to catalyze a variety of hydrocarbon conversions. These conversions include catalytic cracking, hydrocracking, naptha reforming, benzene alkylation, xylene isomerization, catalytic dewaxing, and other conversions.

During use, as is generally know, the catalysts undergo progressive loss of catalytic activity and/or selectivity. The time required for the activity to decay to the point at which the catalyst is no longer useful may vary from as little as a few minutes, as in catalytic cracking, to several years, as with some versions of naptha reforming. Some of the factors which affect the aging rate include the nature of the feed, the nature of the catalyst and process conditions. In general, catalyst deactivation is accompanied by an accumulaton of carbonaceous matter on the catalyst, and it was early learned to regenerate deactivated catalysts by burning the carbonaceous matter in an oxygen-containing gas. In the case of metal-loaded catalysts, the severity of the burning operation often leads to agglomeration of the metal component into relatively large crystallites which, of course, are inherently less active than small crystallites which possess a greater surface area for an equivalent amount of metal.

Reactivation of noble metal catalysts utilized in hydrocarbon processing procedures such as reforming is known in the art. Processes which utilize chlorine and oxygen in catalyst reactivation are well known. For example, U.S. Pat. No. 2,906,702 discloses a method of restoring the activity of an alumina-supported platinum catalyst after deactivation occurring during the reforming of hydrocarbons. According to this method, a deactivated platinum-alumina catalyst is contacted with gaseous chlorine, fluorine, or other halogen or halogen-affording substance at an elevated temperature.

U.S. Pat. No. 3,134,732 describes a method for reactivating noble metal catalyst supported on alumina by contacting the catalyst with halogen-containing gas, stripping excess halogen therefrom and subjecting the resulting catalyst to a reduction step with a hydrogen-containing gas. This treatment is intended to break up the large noble metal crystallites into smaller cyrstallites.

U.S. Pat. No. 3,201,355 discloses reactivating a deactivated metal oxide-supported noble metal catalyst utilized in hydroforming processes. Reactivation is accomplished under anhydrous conditions employing a gaseous source of halogen such as chlorine (which is preferred) or nitrosyl chloride admixed with an oxygen-containing gas such as air or an inert gas such as nitrogen or carbn dioxide as the reactivating agent.

U.S. Pat. No. 3,625,860 discloses a process for activating and/or reactivating a platinum on alumina reforming catalyst by contacting the catalyst which has been previously subjected to a sequence of oxidative burn-off, oxygen treatment, purging and reducing operations with a nonmetallic chloride-containing compound, e.g., an organic chloride such as tertiary butyl chloride, propylene dichloride, carbon tetrachloride, etc., or an inorganic chloride such as hydrogen chloride.

It is also known in the art to regenerate platinum group metal-containing zeolite catalysts. Regeneration of noble metal-loaded zeolite catalysts requires certain procedural modifications because the metal must be returned in a dispersed form within the zeolite pores.

U.S. Pat. No. 3,986,982 describes a procedure in which deactivated platinum group metal-loaded zeolite is contacted with a stream of inert gas containing from 0.5 to 20 percent volume of free oxygen and from 5 to 500 ppm volume of chloride as chlorine, HCl, or an organic chlorine-containing material. The resulting catalyst is purged to remove residual oxgyen and chlorine and then reduced in a stream of hydrogen at 200° to 600° C.

Other processes for regenerating or otherwise treating metal-loaded zeolites, most of which feature the use of molecular chlorine or other source of chlorine, are described in U.S. Pat. Nos. 3,943,052; 4,444,895; 4,444,897; 4,447,551; 4,517,076; 4,518,708; 4,600,700; 4,645,751; and, commonly assigned copending U.S. patent application Ser. No. 819,074, filed Jan. 15, 1986; U.K. Patent application 2,106,413 and European Patent Application No. 142,352.

Processes for treating catalysts featuring the use of an oxide of nitrogen are also known.

U.S. Pat. No. 3,243,383 discloses a process for regenerating a spent cobalt oxide on carbon catalyst, useful in olefin polymerization, wherein the spent catalyst, following heating at 250°–1000° C. in an inert atmosphere and cooling, is treated with nitric acid, nitric oxide (NO), nitrogen dioxide gas ($NO_2$) or mixtures thereof and thereafter ammoniated, if desired, and finally heated to reactivation temperature.

U.S. Pat. No. 3,451,942 describes a process for the rejuvenation of a deactivated hydrocracking catalyst containing a hydrogenation-dehydrogenation component present in the form of large crystallites on an acidic cracking component, e.g., an arsenided-nickel-on-fluorided-silica-alumina catalyst, in which the deactivated catalyst, following removal of at least a major part of the accumulated carbonaceous matter therefrom, is treated with a nitrogen oxide selected from the group consisting of NO, $NO_2$, $N_2O$ and $N_2O_3$, optionally, in aqueous nitric acid solution, under conditions causing the material to react with the hydrogenation-dehydrogenation component. Thereafter, the catalyst is treated with oxygen which reacts with the hydrogenation-dehydrogenation component followed by reduction of the latter with hydrogen. It is hypothesized that the hydrogenation-dehydrogenation component is sequentially converted in this series of operations to a salt, possibly a nitrate, then, following the treatment with oxygen, into an ionic form and finally, following reduction with hydrogen, into small crystallites.

According to the process for regenerating a supported tellurium and/or tellurium compound-containing catalyst disclosed in U.S. Pat. No. 3,536,631, the deactivated catalyst is treated at 50°–400° C. with a gaseous nitrogen oxide of the formula $NO_x$ in which x is 1, 1.5, 2 or 2.5 and/or a gaseous oxyacid of nitrogen of the formula $HNO_y$ in which y is 2 or 3.

Deactivated phosphomolybdic acid based catalysts which are used for the conversion of saturated and unsaturated aldehydes to acids are reactivated by the process of U.S. Pat. No. 4,471,062 by feeding an oxide of nitrogen, preferably nitric oxide (NO), over the deactivated catalyst at 100°–400° C.

Che et al., "A Study of the Chemisorption of Nitric Oxide on PdY Zeolite. Evidence For a Room Temperature Oxidative Dissolution of Pd Crystallites", *J. Phys. Chem.* 80, 2371-2381 (1976) describes the redispersion of mildly agglomerated palladium, i.e., crystallites of 20 Angstroms, supported on zeolite Y with nitric oxide at room temperature. It has been observed that in the case where agglomerated noble metal crystallites of at least about 25 Angstroms average diameter, and more usually at least about 100 Angstroms average diameter, are concerned, e.g., a crystallite size which is typical of a supported noble metal catalyst which has experienced a coke burn-off operation, the redispersion procedure described in this publication does not provide consistent results unless a nitric oxide(s) stripping operation (of which no mention is made by Che et al.) is carried out at the conclusion of the nitric acid-contacting operation.

Foger et al., "The Redispersion of Iridium on $SiO_2$ and Gamma-$Al_2O_3$ Supports with Chlorine-Containing Gases", *J. Catalysis*, 96, 154-169 (1985) discloses that while a gaseous mixture containingg a major amount of chlorine and a minor amount of nitric oxide is effective for redispersing iridiumon alumina, the mixture is not effective for redispersing iridium on silica. Similarly, Foger et al., "Redispersion of Pt-Ir Supported on Gamma-$Al_2O_3$ and $SiO_2$ in Chlorine-Containing Gases"discloses that the aforesaid chlorine-nitric oxide mixture is not effective for redispersing bimetallic Pt-Ir on silica. There is no suggestion in either of these publications of what the effect of using a chlorine-nitric oxide mixture in which the nitric oxide is quantitatively the major reactant would be.

SUMMARY OF THE INVENTION

In accordance with the present invention, a process is provided for dispersing or redispersing a Group VIII noble metal species present on a porous inorganic support which comprises:

(a) contacting a supported Group VIII noble metal species possessing an average crystallite diameter of at least about 25 Angstroms with nitric oxide at a temperature providing dispersion or redispersion of the noble metal species on the support, the support being a porous inorganic material from which at least a major amount of any carbonaceous matter which may have been present thereon has been removed prior to contacting with nitric oxide (b) removing sorbed nitrogen oxide(s) from the supported dispersed/redispersed noble metal species.

The process of this invention can be used to initially disperse the noble metal species when preparing the fresh catalyst as well as to redisperse the agglomerated noble metal species component of a "deactivated catalyst", i.e., a catalyst of diminished activity compared to that of the freshly prepared catalyst, resulting from the use of the catalyst in a chemical conversion process. Dispersion of redispersion effects a reduction in the average diameter, or size, of the noble metal crystallites. For example, when applied to a supported noble metal species possessing an initial average crystallite size of from about 100 to about 1000 Angstroms, i.e., a relatively highly agglomerated metal component, the process of this invention can readily provide a dispersed/redispersed metal species whose average crystallite size has been significantly reduced.

DESCRIPTION OF THE PREFERRED EMBODIMENTS

The dispersion/redispersion process of this invention is carried out upon a supported Group VIII noble metal species, e.g., a metal such as platinum, palladium, iridium, osmium, rhodium or ruthenium. The noble metal species may be present in elemental form or as a compound, e.g., as an oxide or sulfide. Alloys of two or more noble metal species are contemplated. The noble metal species can also be associated with a non-noble metal component present as a promoter. The latter can be selected from the group consisting of Group IB, Group IIIB, Group IVB, Group VB, Group VIB, Group VIIB, and non-noble Group VIII metals. Generally, the catalyst treated by the present invention possesses a noble metal content ranging from about 0.01 to about 10, and preferably about 0.1 to about 3, weight percent.

The porous inorganic support can be any of those encountered in the catalyst art and include materials such as alumina and silica and other highly siliceous materials, both of the amorphours and crystalline variety. Included among the latter are the crystalline aluminosilicates (inclusive of related materials in which aluminum is replaced in whole or in part with one or more other trivalent elements), or zeolites, which may or may not be composited with one or more inorganic catalytically active or inactive refractory binders.

The zeolites constitute an especially prominent class of catalytically active support which are suitable for the practice of this invention. Included among the useful zeolites are zeolite A (U.S. Pat. No. 2,882,243), zeolite X (U.S. Pat. No. 2,882,244), zeolite Y (U.S. Pat. No. 3,130,007), zeolite L (U.S. Pat. No. 3,216,789), zeolite ZK-5 (U.S. Pat. No. 3,247,195), zeolite Beta (U.S. Pat. No. 3,308,069; Re. 28,341), zeolite XK-4 (U.S. Pat. No. 3,314,752), zeolite ZSM-5 (U.S. Pat. No. 3,702,886; Re. 29,948), zeolite ZSM-11 (U.S. Pat. No. 3,709,979), zeolite ZSM-12 (U.S. Pat. No. 3,832,449), zeolite ZSM-20 (U.S. Pat No. 3,972,983), ZSM-35 (U.S. Pat. No. 4,016,245), ZSM-38 (U.S. Pat. No. 4,046,859) and zeolite ZSM-23 (U.S. Pat No. 4,076,842), merely to name a few.

When, in accordance with the process of this invention, it has become apparent that the supported noble metal catalyst composition has become deactivated, e.g., as a result of its use in a hydrocarbon processing operation, the operation is terminated by discontinuing the flow of feedstock to the reactor. It is preferred that the reactor by purged of feedstock by feeding a gaseous reducing agent, preferably dry hydrogen, therethrough. It is contemplated that temperatures of from about 250° C. to about 550° C. and pressures ranging from atmospheric to the operating pressure of the process, e.g., up to about 70 atmospheres, can be used in this operation. Purging the reactor with hydrogen under these conditions simultaneously effects stripping of the catalyst and reduction of any oxidized metal component thereon to the zerovalent state. Of course, reduction of oxidized metal component can be accomplished apart from any purging of the reactor. The reactor can also be purged subsequently with an inert gas in order to remove the hydrogen. Suitable purge conditions include temperature of from about 25 to about 450° C. and pressures of about 1 to 40 atm, using a stream of an inert gas such as nitrogen.

The catalyst is then treated in an oxidizing atmosphere in order to burn off at least a major amount of any carbonaceous deposits which may be present, e.g., coke as well as nitrogen or sulfur compounds. This burning operation is not narrowly critical and suitable conditions range from temperatures of about 260° to about 538° C. (500° to 1000° F.) or even higher and oxygen concentrations range from about 0.10 to 10 mol percent. The duration of the coke burning step is also not narrowly critical and will obviously vary depending on the temperature, oxygen concentration and the amount of coke on the catalyst. Preferred operation of the coke burning step includes treating a spent catalyst with about 0.2 to 7 mol percent of oxygen at temperatures of about 370° to about 454° C. (700 to 850° F.) and pressures of from about 1 to 70 atmospheres. Where the support component of the catalyst is a zeolite, it is preferable that the burn-off conditions be not so severs as to cause any substantial loss in zeolite crystallinity. At this point, any remaining carbon dioxide can be purged from the reactor with an inert gas such as helium or nitrogen.

Following any coke burn-off operation, the metal-loaded catalyst is contacted with gaseous nitric oxide (NO), optionally, in combination with a relatively minor amount of a source of gaseous halogen, preferably, chlorine gas. An inert diluent such as helium or nitrogen can also be present. The conditions of this operation can vary widely and include a concentration of nitric oxide of at least about 0.1 volume percent, preferably at least about 1 volume percent and still more preferably at least about 10 volume percent, a concentration of gaseous halogen or source of halogen where utilized of from about 0.01 to about 0.1 volume percent, preferably from about 0.5 to about 5 volume percent and still more preferably from about 0.2 to about 2 percent and a concentration of inert diluent gas, e.g., nitrogen, where utilized representing the balance of the nitric oxide-containing atmosphere. The latter can be introduced to the contacting zone maintained at a temperature of from about 0° F. to about 1000° F., preferably at from about 40 to about 800° F. and still more preferably at from about 200 to about 750° F., a pressure ranging from atmospheric to about 100 atmospheres, preferably from about 0.5 to about 50 atmospheres and still more preferably from about 1 to about 10 atmospheres at a volumetric flow rate of from about 100 to about 15,000 gaseous hourly space velocity (GHSV), preferably at from about 200 to about 10,000 GHSV and still more preferably at from about 600 to about 6000 GHSV. In general, contact times of from about 10 minutes to 24 hours or more, preferably from 30 minutes to 20 hours and still more preferably from about 1 to about 16 hours provide entirely acceptable results.

Following contact with NO and prior to its use as a catalyst, the supported, dispersed/redispersed noble metal species is purged of sorbed $NO_x$ wherein X is 0.5 to 2. This can be readily accomplished by sweeping the catalyst composition with a suitable gaseous purge medium, nitrogen being advantageously employed for this purpose. The purge operation will normally be carried out under conditions effecting the removal of at least a substantial part, and preferably essentially all, of such sorbed nitrogen oxide(s). Nitrogen purge conducted at elevated temperature, e.g., from about 200 to about 1000° F. and preferably from 500 to about 900° F. for from 10 minutes to 10 hours or more, and preferably from about 30 minutes to about 2 hours generally provides good results.

The following examples are illustrative of the process for dispersing/redispersing metal on a porous inorganic acidic catalyst in accordance with the present invention. In all examples, the treated catalysts were purged with nitrogen or helium at 850° F. for 1 hour.

EXAMPLE 1

A metal-loaded catalyst comprising 0.4 weight percent palladium on a bound ZSM-5 catalyst containing 65 weight percent ZSM-5 and 35 weight percent alumina (Catalyst A) was prepared. The properties of this catalyst are set forth in Table 1 as follows:

TABLE 1

| Properties of Fresh Catalyst A | |
|---|---|
| Palladium, weight percent | 0.35 |
| Sodium, weight percent | 0.027 |
| Chlorine, weight percent | 0.21 |
| Density, g/cc | |
| Packed | 0.543 |
| Particle | 0.890 |
| Real | 2.611 |
| Pore Volume, cc/g | 0.741 |
| Surface Area, $M^2/g$ | 339 |

A portion of Catalyst A was deactivated in an atmosphere of 80 volume percent hydrogen and 20 volume percent steam at 840° F. and 1 atm for 1 hour and purged with helium at the same temperature for 0.5 hour (Catalyst B).

Another portion of Catalyst A was used in hydrodewaxing 650° F.+petroleum chargestocks at conditions of 400 psig $H_2$, 1 LHSV, 2500 scf $H_2$/bbl, 540° F. start-of-cycle temperature and 675° F. end-of-cycle temperature. The duration of this test was 63 days after which the coked catalyst was removed from the reactor. A sample of the coked catalyst was hydrogen reactivated at 900° F. for 18 hours and oxygen regenerated, both operations being carried out at atmospheric pressure, in a glass reactor from about 750° F. to a maximum temperature of 850° F. in increasing oxygen concentration. Elemental analyses of the coked, rectivated, and regenerated catalyst (Catalyst C) are shown in Table 2 as follows:

TABLE 2

| | Elemental Analysis of Catalyst C | | |
|---|---|---|---|
| Element, % | Coked | $H_2$ Reactivated | $O_2$ Regenerated |
| Carbon | 7.95 | 3.54 | 0.015 |
| Nitrogen | 0.20 | 0.21 | <0.03 |
| Sulfur | 0.10 | 0.03 | 0.04 |
| Sodium | 0.023 | 0.026 | 0.01 |
| Palladium | 0.34 | 0.38 | 0.43 |
| Iron | 0.077 | 0.075 | 0.097 |

Another portion of the coked catalyst was regenerated at 100 psig, 850° F. maximum temperature, 7% maximum oxygen concentration and in the presence of 70 torr water vapor. Analysis of the regenerated catalyst (Catalyst D) by scanning scanning transmission electron microscopic (STEM) analysis showed the average size of the agglomerated palladium crystalites to be about 100 Angstroms or larger.

In still another example, a commercial 0.5% Pd/Al$_2$O$_3$ catalyst was deactivated in an atmosphere of 80% hydrogen and 20% steam at 840° F. for 1 hour (Catalyst E).

Catalysts B-E were contacted with 75 volume percent NO and 25 volume percent nitrogen or helium under varying conditions of temperature and time. The redispersion of palladium on Catalysts B-E was monitored by benzene hydrogenation activity (BHA) and STEM analysis. The hydrogenation of benzene to cyclohexane is commonly used to determine catalytic activity of noble metal catalysts. The reaction is generally observed as structure insensitive which means that the specific metal activity is not a function of the size geometry, and orientation of the metal particles on the catalyst. Hence, the test can be used as a measure of the overall extent of metal dispersion.

In this test, a gaseous mixture containing 100:1 molar ratio of hydrogn and benzene is passed through a vertical vycor tubular reactor, ¼" ID and 5" long containing about 250 mg of the palladium catalyst at a hydrogen flow rate of 200 cc/min and a total pressure of 1 atm. The temperature range is from 75-300° F. depending on the activity of the catalyst. Before the introduction of benzene, the catalysts is reduced in flowing hydrogen from ambient temperature to a final temperature of 400° F.

The benzene hydrogenation activity of fresh, deactivated, and nitric oxide rejuvenated catalysts are shown in Table 3 below. In all cases, the rejuvenated catalysts samples have higher activity than the deactivated samples.

TABLE 3

| Benzene Hydrogenation Activity of Palladium Catalysts (Mole/mole Pd/hr at 212° F.) | | | |
|---|---|---|---|
| Catalyst | BHA | NO Treatment | BHA |
| A (Control) | 24.6 | | |
| B | 3.2 | 400° F., 2.5 hr | 28.8 |
| C | 15.7 | 400° F., 2.5 hr | 19.9 |
| D | 0.2 | 400° F., 2.5 hr | 7.1 |
|   |     | 750° F., 3.0 hr | 24.5 |
| E | 0.2 | 400° F., 2.5 hr | 23.5 |

EXAMPLE 2

In place of contacting deactivated Catalysts B-D with No alone as in Example 1, the catalysts were contacted with a gaseous mixture of 50 volume percent NO, 2 volume percent Cl$_2$ and 48 volume percent N$_2$ (diluent) at 390° F. and a total flow of 100 cc/min for 2.5 hrs.

The extent of redispersion as measured by the BHA test is set forth in Table 4 as follows:

TABLE 4

| Benzene Hydrogenation Activity (Mole/mole Pd/hr at 212° F.) | | |
|---|---|---|
|  | Benzene Hydrogenation Activity | |
| Catalyst | Before Treatment | After Treatment |
| A (Control) | 24.6 | — |
| B | 3.2 | 64.7 |
| C | 15.7 | 49.6 |
| D | 0.2 | 39.1 |

It may be noted that the BHA, and therefore the extent of palladium dispersion, of the deactivated catalysts exceeded that of the freshly prepared catalyst.

EXAMPLE 3

This example compares the effectiveness of NO for redispersing palladium on ZSM-5 with that of NO$_2$.

The conditions of treating regenerated Pd ZSM-5 catalysts with NO, NO$_2$ or NO/Cl$_2$ and the BHA levels (mole/mole Pd/hr) of the treated catalysts are set forth in the following table.

TABLE 5

| Comparison of NO with NO$_2$ For The Redispersion of Pd on ZSM-5 | | | |
|---|---|---|---|
|  |  | Benzene Hydrogenation Activity (at 212° F.) | |
| Catalyst | Treatment Conditions | Before Treatment | After Treatment |
| Catalyst C (from Example 1) | NO$_2$ at 400° F. for 2.5 hours | 15.7 | 11.8 |
| Catalyst C | NO at 400° F. for 2.5 hours | 15.7 | 19.9 |
| Catalyst D (from Example 1) | NO$_2$ at 400° F. for 2.5 hours | 0.2 | 6.1 |
| Catalyst D | NO at 400° F. for 2.5 hours | 0.2 | 7.1 |
| Catalyst D | 50 vol. % NO + 2 vol. % Cl$_2$ at 400° F. for 2.5 hours | 0.2 | 39.1 |

These data show that under essentially identical treatment conditions employing essentially identical catalysts, nitric oxide, and especially nitric oxide in admixture with chlorine, resulted in significantly greater BHA levels than nitrogen dioxide.

EXAMPLE 4

A Pd on Al$_2$O$_3$ catalyst had a fresh BHA activity of 57.1 mole/mole Pd/hr. When deactivated in an atmosphere of 80% hydrogen and 20% stream at 800° F. for 1 hr, the BHA activity diminished to zero. Treatment with oxygen at 1100° F. for 2.5 hr increased the activity to 14.6 mole/mole Pd/hr. However, treatment with NO at 390° F. for 2.5 hr followed by helium purge restored the BHA activity to 23.5 mole/mole Pd/hr.

EXAMPLE 5

Zirconium was introduced as a complex cation (specifically, a complex of aluminum zirconium hyroxychloride with glycine: REZAL, from Reheis Chemical Company) with aluminum hydroxychloride during the zeolite/alumina mulling step of the catalyst preparation. This component was added in order to improve the dispersion of palladium and to increase the physical strength of the catalysts. The catalyst contained 2.5 wt. % ZrO$_2$, which replaced 7 wt. % of the alumina binder of a 65 wt. % ZSM-5/35 wt. % Al$_2$O$_3$ formulation. For comparison, a catalyst with 65% ZSM-5 in 35% Al$_2$O$_3$ matrix was also prepared. Both catalysts contained 0.39% palladium. BHA levels of fresh, steam deactivated, and NO rejuvenated catalyst are shown in the following table:

TABLE 6

| Benzene Hydrogenation Activity (NO Treatment at 390° F. for 2.5 hr.) | | |
|---|---|---|
| Pretreatment | Al$_2$O$_3$ Supoprt BHA | Al$_2$O$_3$/ZrO$_2$ Support BHA |
| Fresh | 20.4 | 23.8 |

TABLE 6-continued
Benzene Hydrogenation Activity
(NO Treatment at 390° F. for 2.5 hr.)

| Pretreatment | Al$_2$O$_3$ Supoprt BHA | Al$_2$O$_3$/ZrO$_2$ Support BHA |
|---|---|---|
| Reduced (H$_2$, 800° F., 1 hr) | 4.1 | 8.7 |
| NO treated | 40.5 | 36.3 |
| Steamed (80% H$_2$/20% steam, 800° F., 1 hr) | 2.4 | 5.9 |
| NO treated | 19.6 | 19.1 |

On hydrogen-reduced or hydrogen/steam deactivated catalysts, higher BHA activity was observed when zirconium was present. In both cases, the deactivated catalysts could be rejuvenated with nitric oxide after which the hydrogenation activity increased to at least that of the fresh catalyst.

EXAMPLE 6

A variety of zeolite-supported platinum catalysts were prepared and treated under the conditions and with the observed BHA levels (mole/mole Pt/hr) shown in the following table.

TABLE 7
BHA Levels (at 212° F.) Of Pt Zeolite Catalyst Compositions

| Catalyst | Treatment | BHA |
|---|---|---|
| 0.66 wt. % Pt/Zeolite Beta/Alumina | Fresh Cat. | 969 |
| 0.66 wt. % Pt/Zeolite Beta/Alumina | 75 vol. % Air/25 vol. % H$_2$O at 1000° F., 3 hr. | 580 |
| 0.66 wt. % Pt/Zeolite Beta/Alumina | 50 vol. % NO/2 vol. % Cl$_2$ at 570° F., 3 hr. | 2160 |
| 0.66 wt. % Pt/Zeolite Beta/Alumina | 50 vol. % NO/2 vol. % Cl$_2$ at 570° F., 3 hr. | 1400 |
| 0.66 wt. % Pt/Zeolite Beta/Alumina | 4 vol. % Cl$_2$ in 96 vol. % N$_2$ at 570° F., 3 hr. | 716 |
| 0.6 wt. % Pt/Alumina | Fresh Cat. | 226 |
| 0.6 wt. % Pt/Alumina | 75 vol. % Air/25 vol. % H$_2$O at 570° F., 3 hr. | 9 |
| 0.6 wt. % Pt/Alumina | 50 vol. % NO/2 vol. % Cl$_2$ at 570° F., 3 hr. | 657 |
| 0.66 wt. % Pt/Zeolite Beta/Alumina | Fresh Cat. | 969 |
| 0.66 wt. % Pt/Zeolite Beta/Alumina | H$_2$, 750° F., 1 hr. 35 vol. % Air/65 vol. % H$_2$O at 1000° F., 18 hr. | 223 |
| 0.66 wt. % Pt/Zeolite Beta/Alumina | 50 vol. % NO/2 vol. % Cl$_2$ at 570° F., 3 hr. | 945 |
| 1.1 wt. % Pt/ZSM-5/Alumina | Fresh Cat. | 81 |
| 1.1 wt. % Pt/ZSM-5/Alumina | H$_2$, 750° F., 1 hr. 35 vol. % Air/65 vol. % H$_2$O 1000° F., 18 hr. | 43 |
| 1.1 wt. % Pt/ZSM-5/Alumina | 50 vol. % NO/2 vol. % Cl$_2$ at 570° F., 3 hr. | 242 |
| 0.1 wt. % Pt/ZSM-5/Alumina | Fresh Cat. | 148 |
| 0.1 wt. % Pt/ZSM-5/Alumina[1] | 50 vol. % NO/2 vol. % Cl$_2$ | 181 |
| 0.1 wt. % Pt/ZSM-5/Alumina[2] | 50 vol. % NO/2 vol. % Cl$_2$ | 206 |

[1,2]These catalysts were derived from regenerated catalysts having BHA values of 28 and 92, respectively.

What is claimed is:

1. A process for dispersing or redispersing a Group VIII noble metal species present on a porous inorganic support which comprises:
   (a) contacting a supported Group VIII noble metal species possessing an average crystalline diameter of at least about 100 Angstroms with nitric oxide at a temperature providing dispersion or redispersion of the noble metal species on the support, the support being a porous inorganic meterial containing no, or at most a minor, amount of carbonaceous material; and,
   (b) removing at least a substantial part of the sorbed nitrogen oxide(s) from the supported dispersed/redispersed noble metal species by a gaseous purge at a temperature in the range of about 200° F. to about 1000° F.

2. The process of claim 1 wherein the noble metal species is at least one metal, oxide or sulfide selected from the group consisting of platinum, palladium, iridium, osmium, rhodium and ruthenium metal, oxide or sulfide.

3. The process of claim 2 wherein there is additionally present at least one non-noble metal selected from Group IB, Group IIIB, Group IVB, Group VB, Group VIB, Group VIIB or Group VIII of the Periodic Table of the Elements as a promoter.

4. The process of claim 1 wherein the porous inorganic support is a catalytically active material.

5. The process of claim 1 wherein the porous inorganic support is a siliceous material.

6. The process of claim 1 wherein the porous inorganic support is a crystalline material.

7. The proces of claim 1 wherein the porous inorganic support is a zeolite.

8. The process of claim 7 wherein the zeolite is zeolite L, X, Y, Beta, ZSM-5, ZSM-11, ZSM-12, ZSM-20, ZSM-23, ZSM-35, ZSM-38 or ZSM-48.

9. The process of claim 1 wherein the concentration of nitric oxide is at least about 0.1 volume percent.

10. The process of claim 1 wherein the temperature of contacting with nitric oxide is from about 0° F. to about 1000° F.

11. The process of claim 1 wherein purging is carried out with nitrogen.

12. A process for dispersing or redispersing a Group VIII noble metal species present on a porous inorganic support which comprises:
   (a) contacting a supported Group VIII noble metal species possessing an average crystalline diameter of at least about 100 Angstroms with a gaseous mixture comprising a major amount of nitric oxide and a minor amount of gaseous halogen at a temperature providing dispersion or redispersion of the noble metal species on the support, the support being a porous inorganic material; and,
   (b) removing at least a substantial part of the sorbed nitrogen oxide(s) from the supported dispersed/redispersed noble metal species by a gaseous purge at a temperature in the range of about 200° F. to about 1000° F.

13. The process of claim 12 wherein the porous inorganic support is a siliceous material.

14. The process of claim 13 wherein the siliceous material is a zeolite and the source of gaseous halogen is chlorine.

15. The process of claim 12 wherein the concentration of gaseous source of halogen is at least about 0.01 volume percent.

* * * * *